US008549490B2

(12) United States Patent
Dolby et al.

(10) Patent No.: US 8,549,490 B2
(45) Date of Patent: Oct. 1, 2013

(54) STATIC CODE ANALYSIS FOR PACKAGED APPLICATION CUSTOMIZATION

(75) Inventors: Julian T. Dolby, Riverdale, NY (US); Richard T. Goodwin, Hawthorne, NY (US); Anca Andreea Ivan, San Jose, CA (US); Manas R. Kumar Singh, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 12/569,515

(22) Filed: Sep. 29, 2009

(65) Prior Publication Data

US 2011/0078667 A1   Mar. 31, 2011

(51) Int. Cl.
*G06F 9/44* (2006.01)
(52) U.S. Cl.
USPC .......................................................... 717/133
(58) Field of Classification Search
USPC .......................................................... 717/133
See application file for complete search history.

(56) References Cited

U.S. PATENT DOCUMENTS

| | | | |
|---|---|---|---|
| 6,588,009 B1 * | 7/2003 | Guffens et al. | 717/161 |
| 7,137,104 B2 * | 11/2006 | Tip et al. | 717/126 |
| 7,302,679 B2 | 11/2007 | Chakrabarti et al. | |
| 7,320,122 B2 | 1/2008 | Chawla et al. | |
| 7,490,319 B2 * | 2/2009 | Blackwell et al. | 717/124 |
| 7,908,162 B2 * | 3/2011 | Jennings | 717/136 |
| 8,302,073 B2 * | 10/2012 | Caceres et al. | 717/109 |
| 2003/0110472 A1 * | 6/2003 | Alloing et al. | 717/122 |
| 2005/0183067 A1 * | 8/2005 | Dimpsey et al. | 717/128 |
| 2006/0048093 A1 | 3/2006 | Jain et al. | |
| 2006/0190923 A1 * | 8/2006 | Jubran | 717/104 |
| 2006/0206831 A1 | 9/2006 | Beck et al. | |
| 2007/0006151 A1 * | 1/2007 | Conway et al. | 717/120 |
| 2007/0150875 A1 | 6/2007 | Nakamura et al. | |
| 2007/0288899 A1 | 12/2007 | Fanning et al. | |
| 2008/0010327 A1 | 1/2008 | Steensgaard et al. | |
| 2008/0222616 A1 * | 9/2008 | Cheng et al. | 717/137 |
| 2008/0244517 A1 * | 10/2008 | Rostoker | 717/120 |
| 2009/0300587 A1 * | 12/2009 | Zheng et al. | 717/127 |
| 2010/0131916 A1 * | 5/2010 | Prigge | 717/104 |
| 2010/0153933 A1 * | 6/2010 | Bohlmann et al. | 717/144 |

OTHER PUBLICATIONS

Maletic et al., "Source Code Files as Structured Documents", 2002, Kent State University.*
Dor et al., "Customization Change Impact Analysis for ERP Professionals via Program Slicing", 2008, ACM.*
"ABAP/4 Frequently Asked Question, SAP R/3 Document: FAQ—ABAP/4 Dictionary"; pp. 1 to 16.

* cited by examiner

*Primary Examiner* — Anna Deng
*Assistant Examiner* — Junchun Wu
(74) *Attorney, Agent, or Firm* — Steven M. Greenberg, Esq.; Carey, Rodriguez, Greenberg & O'Keefe

(57) ABSTRACT

A method for static code analyzing customizations to a pre-packaged computing solution can include establishing a communicative connection from a recommendation generation module to a pre-packaged computing solution and authenticating into the pre-packaged computing solution. Customized program code can be extracted from the pre-packaged computing solution and a call graph of the customized program code can be constructed such that the call graph indicates method calls to different interfaces for program code of the pre-packaged computing solution. Finally, a report can be generated identifying customized program code to be adapted to a new version of the pre-packaged computing solution based upon changes in the different interfaces shown by the call graph to be used in the new version of the pre-packaged computing solution and modifications required for the customized program code to call the different interfaces in the new version of the pre-packaged computing solution.

15 Claims, 2 Drawing Sheets

STATIC CODE ANALYSIS FOR PACKAGED APPLICATION CUSTOMIZATION

BACKGROUND OF THE INVENTION

1. Field of the Invention

The present invention relates to static code analysis in general and more particularly to static code analysis for packaged application customization.

2. Description of the Related Art

The traditional computing marketplace provides for pre-packaged computing solutions to various personal and industrial problems. Core pre-packaged computing solutions address the most basic industrial needs, including back office accounting, order entry, inventory and billing. Other advanced pre-packaged computing solutions provide for customer relationship management and enterprise resource management. To the extent that a pre-packaged computing solution does not address the particular needs of an end user, historically the end user would have simply developed a customized solution from scratch using either in-house or contracted software development expertise. Though it is an advantage for the enterprise to enjoy a computing solution developed to specifically address the unique qualities of the enterprise, to do so comes at great cost in terms of required human resources. Yet the enterprise often cannot afford to "fit" a pre-packaged computing solution to the day-to-day business processes of the enterprise.

To address the quandary faced by many in respect to selecting either a pre-packaged computing solution, or developing a completely customized computing solution, customizable pre-packaged computing solutions have been successfully marketed and deployed into the enterprise. In a customizable pre-packaged computing solution, a complete enterprise solution is provided to the end user requiring some modest configuration before deployment. Out of the box, the pre-packaged computing solution can meet many of the needs of the end user. To support the necessity of modification of some of the functionality of the customizable pre-packaged computing solution, the pre-packaged computing solution provides a facility for linking custom program code to the underling application, as well as customized user interface elements and customized data tables. A prime example of a customizable pre-packaged computing solution is the SAP R/3™ computer program product manufactured by SAP A.G. of Walldorf, Federal Republic of Germany.

Once a customizable pre-packaged computing solution has been fully customized to meet the needs of the end user, maintaining the solution can be difficult. In particular, as updates and upgrades to the underlying pre-packaged computing solution become available, customizations must be monitored and occasionally modified to ensure compatibility with the upgrade. Further, as new customizations and/or configuration changes are proposed, those customizations must maintain compatibility with both the underlying pre-packaged computing solution and any inter-dependent customized code. As such, prior to upgrading or harmonizing an installation of a customizable pre-packaged solution, an analysis phase must be performed in order to determine the shear quantity of customized program code and customized data present, the dependencies between customized program code, tables, and interfaces, the likely effect of changes upon a new system instance, the way in which the program data has been modified and the requisite mapping of the data between systems.

BRIEF SUMMARY OF THE INVENTION

Embodiments of the present invention address deficiencies of the art in respect to the static analysis of a customizable pre-packaged application and provide a novel and non-obvious method, system and computer program product for performing a static code analysis of customizations to a pre-packaged computing solution. In an embodiment of the invention, a method for static code analysis of customizations to a pre-packaged computing solution can be provided. The method can include establishing a communicative connection from a recommendation generation module executing in memory by a processor of a computer to a pre-packaged computing solution and authenticating into the pre-packaged computing solution.

Customized program code can be extracted from the pre-packaged computing solution and stored in storage coupled to the computer. A call graph of the customized program code can be constructed in the storage such that the call graph indicates method calls to different interfaces for program code of the pre-packaged computing solution. Finally, a report can be generated by the recommendation generation module identifying customized program code to be adapted to a new version of the pre-packaged computing solution based upon changes in the different interfaces shown by the call graph to be used in the new version of the pre-packaged computing solution and modifications required for the customized program code to call the different interfaces in the new version of the pre-packaged computing solution.

In one aspect of the embodiment, customized data tables also can be extracted from the pre-packaged computing solution and stored in the storage. Consequently, customized data tables utilized by the customized program code can included in the report. Likewise, a business process hierarchy (BPH) can be extracted from the pre-packaged computing solution and stored in the storage. As a result, different business processes utilizing the customized program code can be included in the report. Even further, customized program code frequently called in the call graph can be included in the report. Finally, customized program code corresponding to service definitions requisite in a services oriented architecture (SOA) can be included in the report.

In another embodiment of the invention, a code analysis data processing system can be configured for static code analysis of customizations to a pre-packaged computing solution. The system can include a computer with processor, memory, fixed storage and an operating system executing therein. The computer can be coupled to a pre-packaged computing solution over a computer communications network and the pre-packaged computing solution can include customized program code, customized data tables and a customized configuration. Finally, a recommendation generation module can be provided to include computer program instructions hosted by the operating system.

The instructions when loaded into the memory and executed by the processor cause the computer to extract customized program code from the pre-packaged computing solution and store the extracted customized program code in the fixed storage. The instructions when executed also cause the computer to build a call graph of the customized program code in the fixed storage, such that the call graph indicates method calls to different interfaces for program code of the pre-packaged computing solution. Finally, the instructions when executed cause the computer to generate a report identifying customized program code to be adapted to a new version of the pre-packaged computing solution based upon changes in the different interfaces in the new version of the pre-packaged computing solution and modifications required for the customized program code to call the different interfaces in the new version of the pre-packaged computing solution.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a static code analysis of customizations to a pre-packaged computing solution. In accordance with an embodiment of the present invention, customizations to a pre-packaged computing solution can be identified in comparison to a known configuration, data and program code for the pre-packaged computing solution. Program code for the identified customizations can be parsed and a call graph generated for program code for the identified customizations. Thereafter, a report can be generated indicating program code able to be migrated to a different version of the pre-packaged computing solution with no modification (i.e., because a corresponding called interface in the pre-packaged computing solution has not changed in the different version), with a minor modification (i.e., because the corresponding called interface has changed), and with major modification (i.e., because a method underlying the corresponding called interface has become obsolete in the different version).

Figure 1:
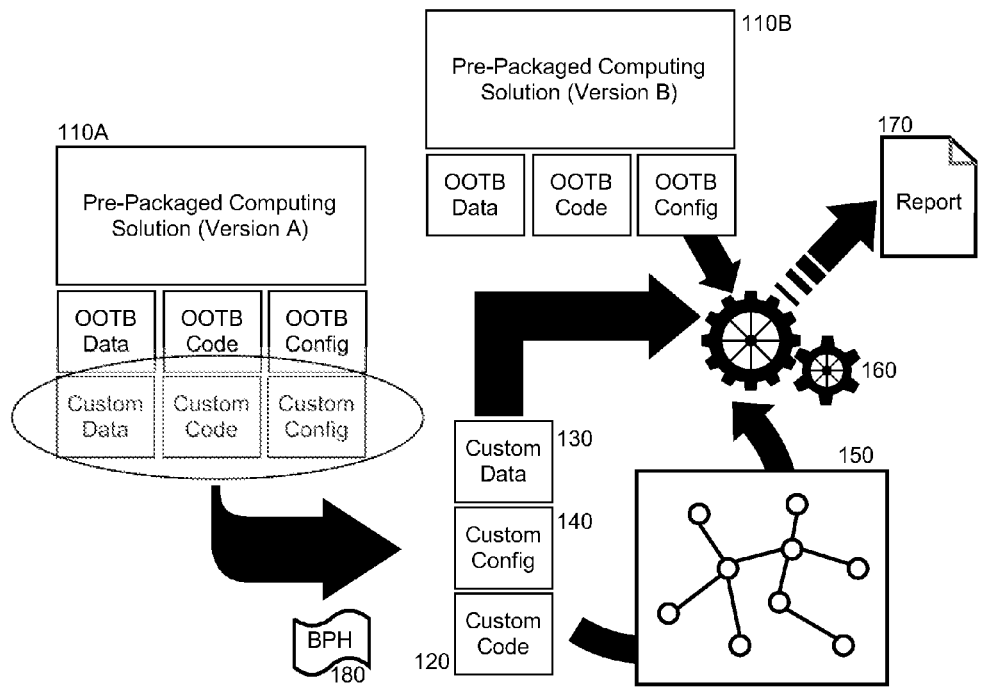
FIG. 1 is a pictorial illustration of a process for static code analyzing customizations to a pre-packaged computing solution.

In further illustration, FIG. 1 pictorially shows a process for static code analyzing customizations to a pre-packaged computing solution. As shown in FIG. 1, version of a pre-packaged computing solution 110A can be analyzed to identify customized data 130, program code 120 and configuration settings 140 relative to out-of-the-box data, program code and configuration settings provided with the version of the pre-packaged computing solution 110A. Further, a business process hierarchy (BPH) 180 can be extracted from the pre-packaged computing solution 110. A call graph 150 can be created for the customized program code 120 in order to determine portions of the customized program code 120 dependent upon out-of-the-box program code provided by the pre-packaged computing solution 110A. Also, a relationship between the different business processes in the BPH 180 can be determined for different method calls (synonymous with function calls) in the customized program code 120 evident from the call graph 150.

Specifically, static code analysis logic 160 can analyze each method call evident from the call graph 150 to program code provided by the pre-packaged computing solution 110A to identify a corresponding interface to a method in the out-of-the-box program code. The interface for each called method for the pre-packaged computing solution 110A can be compared to an interface for a counterpart method for a different version of the pre-packaged computing solution 110B. Thereafter, static code analysis logic 160 can generate a report 170 to identify portions of the customized program code 120 readily adapted to the pre-packaged computing solution 110B based upon method calls by the customized program code 120 to methods in the pre-packaged computing solution 110A that are accessed by an interface that has changed little or not at all in the pre-packaged computing solution 110B. The report 170 further can identify portions of the customized program code 120 seldom called for omission from adaptation to the pre-packaged computing solution 110B, and portions of the customized program code 120 frequently called for inclusion in adaptation to the pre-packaged computing solution 110B.

Figure 2:
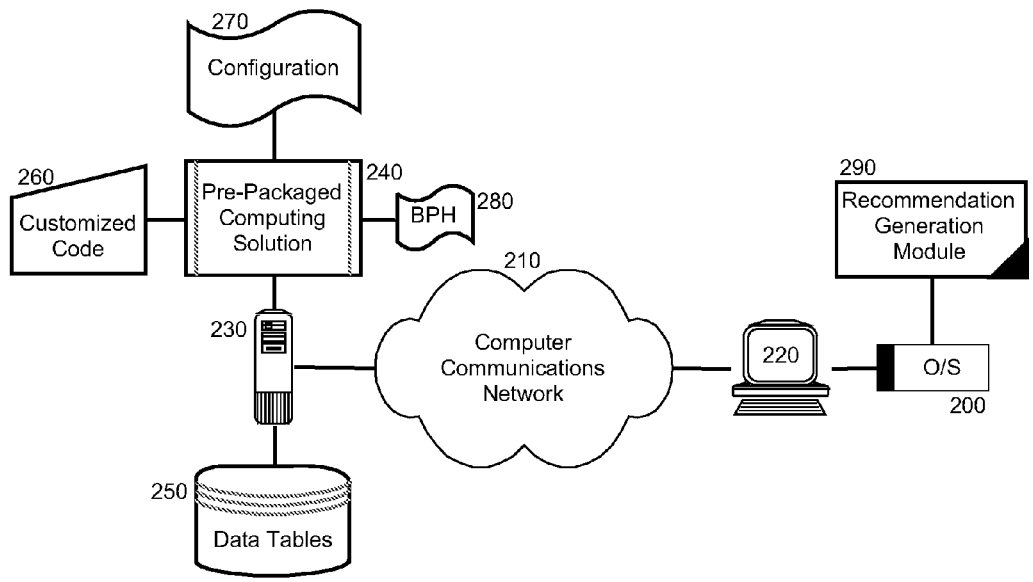
FIG. 2 is a schematic illustration of a code analysis data processing system configured for static code analysis of customizations to a pre-packaged computing solution; and, FIG. 3 is a flow chart illustrating a process for static code analyzing customizations to a pre-packaged computing solution.

The process described in connection with FIG. 1 can be implemented in a code analysis data processing system. In further illustration, FIG. 2 is a schematic illustration of a code analysis data processing system configured for static code analysis of customizations to a pre-packaged computing solution. The system can include a host computer 220 with processor and memory configured for communicative coupling to a remote server 230 over computer communications network 210. The remote server 230 can support the execution of a pre-packaged computing solution 240, such as an enterprise resource planning (ERP) application and the like. The pre-packaged computing solution 240 can include out-of-the-box functionality provided by base program code and data and a base configuration. The functionality of the pre-packaged computing solution 240; however, can be modified according to customized program code 260, customized data tables 250 and a customized configuration 270.

The host computer 220 can include an operating system 200 executing in the memory of the computer 220 and hosting a recommendation generation module 290. The recommendation generation module 290 can include program code that when executed by the processor of the computer 220, performs static code analysis of the customized program code 260, data tables 250 and configuration 270 of the pre-packaged computing solution 240. In this regard, the recommendation generation module 290 can be embodied by a standalone computer program executing by way of the operating system 200, as a network distributable application provided for execution in a Web browser from over the computer communications network 210, or as a plug-in or add-on to an integrated development environment (IDE) executing by way of the operating system 200.

The recommendation generation module 290 in particular can identify the customized program code 260, data tables 250 and configuration 270 of the pre-packaged computing solution 240, and a BPH 280 as well. The recommendation generation module 290 can build a call graph—namely a directed graph that represents calling relationships between subroutines in a computer program—for the customized program code 260 in order to identify dependencies of the customized program code 260 upon different methods of the pre-packaged computing solution 240 as well as different business processes specified by the BPH 280. Based upon those dependencies and each interface for each method call to the different methods of the pre-packaged computing solution 240, it can be determined whether or not different portions of the customized program code 260 can be readily ported to a new version of the pre-packaged computing solution 240. This determination can be particularly helpful in the course of upgrading the pre-packaged computing solution 240 to a new version, or consolidating multiple different installations of different versions of the pre-packaged computing solution 240, or deploying the customized program code 260 to a services oriented architecture (SOA) accessible by the pre-packaged computing solution 240.

Figure 3:
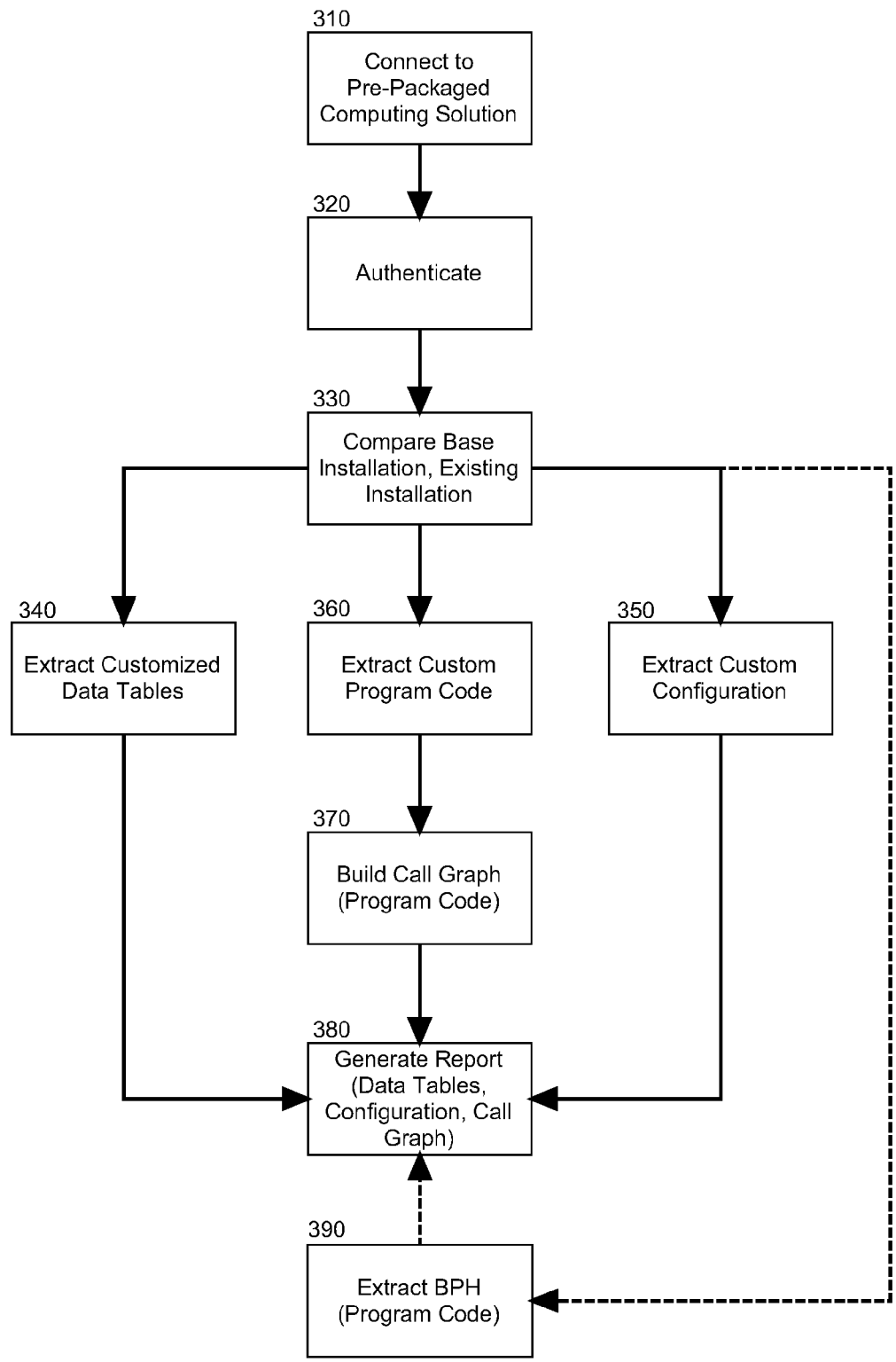

In even yet further illustration of the operation of the recommendation generation module 290, FIG. 3 is a flow chart illustrating a process for static code analyzing customizations to a pre-packaged computing solution. Beginning in block 310, an end user can establish a communicative connection with a pre-packaged computing solution and can authenticate into the pre-packaged computing solution in block 320. In block 330, a known base installation of the pre-packaged computing solution can be compared to the contemporary installation of the pre-packaged computing solution in block 330. For example, the interfaces for the advanced business application programming (ABAP) code of the installations of different SAP R/3 computing solutions can be compared to one another to identify differences in the interfaces.

Subsequently, in block 340 customized data tables for the pre-packaged computing solution can be extracted and stored locally, customized configuration settings for the pre-packaged computing solution can be extracted and stored locally in block 350, and customized program code for the pre-packaged computing solution can be extracted and stored locally in block 360. In the latter instance, processes to be ported from one pre-packaged computing solution to another can be determined by extracting the business process hierarchies (BPH) from the contemporary installation of the pre-packaged computing solution in block 390.

In block 370, a call graph can be generated for the customized program code stored locally. Specifically, the customized program code stored locally can be parsed and different abstract syntax trees (ASTs) can be constructed to reflect the dependencies between programs embodied within the customized program code and other programs embodied within the customized program code, interfaces to methods embodied within the pre-packaged computing solution and the stored data tables. Finally, in block 380 a report can be generated based upon the call graph:

(1) to identify data and code dependencies;
(2) to correlate portions of the customized program code and defined business processes of the BPH by way of transaction codes;
(3) to identify mandatory fields in a form set forth in the customized program code;
(4) to select candidate portions of the customized program code corresponding to service definitions requisite in a SOA;
(5) to identify portions of the customized program code readily adapted to a different version of the pre-packaged computing solution based upon a reliance upon an interface that has not changed or has changed little from version to version of the pre-packaged computing solution; and,
(6) to identify portions of the customized program code used infrequently enough so as to obviate the need to adapt those portions to a different version of the pre-packaged computing solution.

Utilizing the report produced in block 380, the complexity of porting a customized form of the pre-packaged computing solution from one version of the pre-packaged computing solution to another can be determined at the outset so as to better plan for the porting exercise.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for static code analysis of customizations to a pre-packaged computing solution, the method comprising:
    establishing a connection from a recommendation generation module executing in memory by a processor of a computer to a pre-packaged computing solution;
    extracting customized program code from the pre-packaged computing solution and storing the extracted customized program code in storage coupled to the computer;
    building a call graph of the customized program code in the storage, by building different abstract syntax trees (ASTs) for different portions of the customized program code, the ASTs defining dependencies between different programs in the customized program code, interfaces provided by the pre-packaged computing solution, and data tables for the pre-packaged computing solution, the call graph indicating method calls to different interfaces for program code of the pre-packaged computing solution; and,
    generating a report by the recommendation generation module identifying customized program code to be adapted to a new version of the pre-packaged computing solution, wherein the identifying of customized program code is based upon (a) changes in the different interfaces shown by the call graph to be used in the new version of the pre-packaged computing solution and (b) modifications required for the customized program code to call the different interfaces in the new version of the pre-packaged computing solution.

2. The method of claim 1, further comprising:
    extracting customized data tables from the pre-packaged computing solution and storing the extracted customized data tables in the storage; and,
    identifying in the report customized data tables utilized by the customized program code.

3. The method of claim 1, further comprising:
    extracting a business process hierarchy (BPH) from the pre-packaged computing solution and storing the BPH in the storage; and,
    identifying in the report different business processes utilizing the customized program code.

4. The method of claim 1, further comprising identifying in the report customized program code frequently called in the call graph.

5. The method of claim 1, further comprising identifying in the report customized program code corresponding to service definitions requisite in a services oriented architecture (SOA).

6. A code analysis data processing system configured for static code analysis of customizations to a pre-packaged computing solution, the system comprising:
    a computer with processor, memory, fixed storage and an operating system executing therein, the computer being coupled to a pre-packaged computing solution over a computer communications network, the pre-packaged computing solution comprising customized program code, customized data tables and a customized configuration; and, a recommendation generation module comprising computer program instructions hosted by the operating system, the instructions when loaded into the memory and executed by the processor cause the computer to perform the steps of:

extracting customized program code from the pre-packaged computing solution and storing the extracted customized program code in the fixed storage;

building a call graph of the customized program code in the fixed storage, by building different abstract syntax trees (ASTs) for different portions of the customized program code, the ASTs defining dependencies between different programs in the customized program code, interfaces provided by the pre-packaged computing solution, and data tables for the pre-packaged computing solution, the call graph indicating method calls to different interfaces for program code of the pre-packaged computing solution; and, generating a report by the recommendation generation module identifying customized program code to be adapted to a new version of the pre-packaged computing solution based upon changes in the different interfaces shown by the call graph to be used in the new version of the pre-packaged computing solution and modifications required for the customized program code to call the different interfaces in the new version of the pre-packaged computing solution.

7. The system of claim 6, wherein the instructions when loaded into the memory and executed by the processor further cause the computer to perform the steps of:

extracting customized data tables from the pre-packaged computing solution and storing the extracted customized data tables in the storage; and, identifying in the report customized data tables utilized by the customized program code.

8. The system of claim 6, wherein the instructions when loaded into the memory and executed by the processor further cause the computer to perform the steps of:

extracting a business process hierarchy (BPH) from the pre-packaged computing solution and storing the BPH in the storage; and, identifying in the report different business processes utilizing the customized program code.

9. The system of claim 6, wherein the instructions when loaded into the memory and executed by the processor further cause the computer to perform the steps of:

identifying in the report customized program code frequently called in the call graph.

10. The system of claim 6, wherein the instructions when loaded into the memory and executed by the processor further cause the computer to perform the steps of:

identifying in the report customized program code corresponding to service definitions requisite in a services oriented architecture (SOA).

11. A computer program product comprising a computer usable storage memory storing computer usable program code for static code analyzing customizations to a pre-packaged computing solution, the computer program product comprising:

computer usable program code for establishing a communicative connection from a recommendation generation module executing in memory by a processor of a computer, to a pre-packaged computing solution and authenticating into the pre-packaged computing solution;

computer usable program code for extracting customized program code from the pre-packaged computing solution and storing the extracted customized program code in storage coupled to the computer;

computer usable program code for building a call graph of the customized program code in the storage, by building different abstract syntax trees (ASTs) for different portions of the customized program code, the ASTs defining dependencies between different programs in the customized program code, interfaces provided by the pre-packaged computing solution, and data tables for the pre-packaged computing solution, the call graph indicating method calls to different interfaces for program code of the pre-packaged computing solution; and, computer usable program code for generating a report by the recommendation generation module identifying customized program code to be adapted to a new version of the pre-packaged computing solution based upon changes in the different interfaces shown by the call graph to be used in the new version of the pre-packaged computing solution and modifications required for the customized program code to call the different interfaces in the new version of the pre-packaged computing solution.

12. The computer program product of claim 11, further comprising:

computer usable program code for extracting customized data tables from the pre-packaged computing solution and storing the extracted customized data tables in the storage; and, computer usable program code for identifying in the report customized data tables utilized by the customized program code.

13. The computer program product of claim 11, further comprising:

computer usable program code for extracting a business process hierarchy (BPH) from the pre-packaged computing solution and storing the BPH in the storage; and, computer usable program code for identifying in the report different business processes utilizing the customized program code.

14. The computer program product of claim 11, further comprising computer usable program code for identifying in the report customized program code frequently called in the call graph.

15. The computer program product of claim 11, further comprising computer usable program code for identifying in the report customized program code corresponding to service definitions requisite in a services oriented architecture (SOA).

* * * * *